(12) United States Patent
Winter et al.

(10) Patent No.: US 7,090,708 B2
(45) Date of Patent: Aug. 15, 2006

(54) FILTER ELEMENT FOR FILTERING A FLUID STREAM

(75) Inventors: Manfred Winter, Oedheim (DE);
Bernhard Staudenmayer, Dudenhofen (DE); Angelika Gohle, Schwegenheim (DE); Holger Weiss, Speyer (DE)

(73) Assignee: Mann & Hummel GmbH, Ludwigsburg (DE)

( * ) Notice: Subject to any disclaimer, the term of this patent is extended or adjusted under 35 U.S.C. 154(b) by 228 days.

(21) Appl. No.: 10/435,688

(22) Filed: May 12, 2003

(65) Prior Publication Data
US 2004/0050772 A1 Mar. 18, 2004

(30) Foreign Application Priority Data
May 10, 2002 (DE) .................... 102 20 724

(51) Int. Cl.
B01D 46/02 (2006.01)
(52) U.S. Cl. ............... 55/357; 55/356; 55/482; 55/492; 55/495; 55/498; 55/499; 55/500; 55/502; 55/527; 55/DIG. 5
(58) Field of Classification Search ........... 55/356, 55/357, 385.1, 385.3, 482, 486, 487, 490, 55/492, 495, 497, 498, 500, 502, 505, 507, 55/510, 521, DIG. 5, 527, 499; 210/483, 210/488
See application file for complete search history.

(56) References Cited

U.S. PATENT DOCUMENTS

| | | | | |
|---|---|---|---|---|
| 4,301,012 A * | 11/1981 | Puckett | ............... | 55/497 |
| 4,490,253 A * | 12/1984 | Tafara | ............... | 55/DIG. 5 |
| 4,588,464 A * | 5/1986 | Miyagi et al. | ............... | 55/DIG. 5 |
| 5,290,445 A | 3/1994 | Buttery | | |
| 5,293,935 A * | 3/1994 | Arterbury et al. | ............... | 210/497.01 |
| 5,814,118 A * | 9/1998 | Wickland et al. | ............... | 55/486 |
| 5,855,635 A * | 1/1999 | Rice | ............... | 55/DIG. 5 |
| 5,893,937 A * | 4/1999 | Moessinger | ............... | 55/505 |
| 6,093,237 A * | 7/2000 | Keller et al. | ............... | 55/492 |
| 6,152,979 A * | 11/2000 | Cappuyns | ............... | 55/502 |
| 6,652,615 B1* | 11/2003 | Quick et al. | ............... | 55/510 |
| 6,863,758 B1* | 3/2005 | Altmeyer et al. | ............... | 55/492 |
| 2004/0031253 A1* | 2/2004 | Staudenmayer et al. | ............... | 55/486 |
| 2004/0031748 A1* | 2/2004 | Kochert et al. | ............... | 210/488 |

FOREIGN PATENT DOCUMENTS

| | | |
|---|---|---|
| DE | 3723807 | 1/1989 |
| DE | 19519438 | 11/1996 |
| DE | 19540876 | 5/1997 |
| GB | 2307426 | 5/1997 |
| WO | WO 98/45009 | 10/1998 |
| WO | WO 99/10080 * | 3/1999 |
| WO | WO 02/49738 | 6/2002 |

OTHER PUBLICATIONS

XP-002252205 abstract for JP2001029720.
XP-002252206 abstract for JP11216320
European Search Report dated Sep. 9, 2003.

* cited by examiner

*Primary Examiner*—Jason M. Greene
(74) *Attorney, Agent, or Firm*—Crowell & Moring LLP

(57) ABSTRACT

A filter element for filtering a fluid stream, comprising a cylindrical support body, which is provided with openings and is sealed at one axial end, and a filter medium arranged on the support body. The filter medium is a strip material, which extends over approximately the entire length of the support body, and is wrapped around the circumference of the support body, and the start and the end of the strip material are welded together.

6 Claims, 4 Drawing Sheets

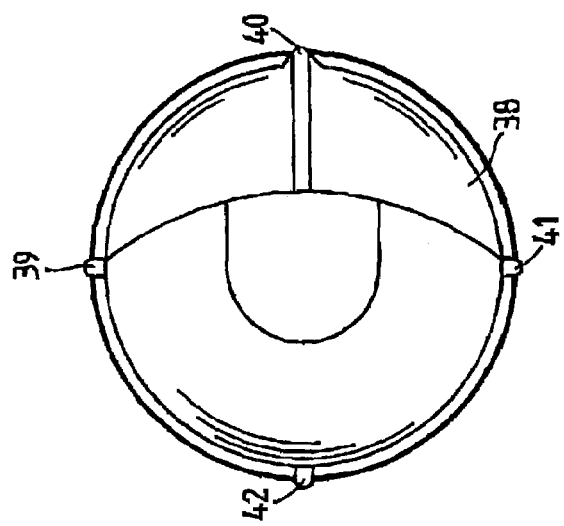
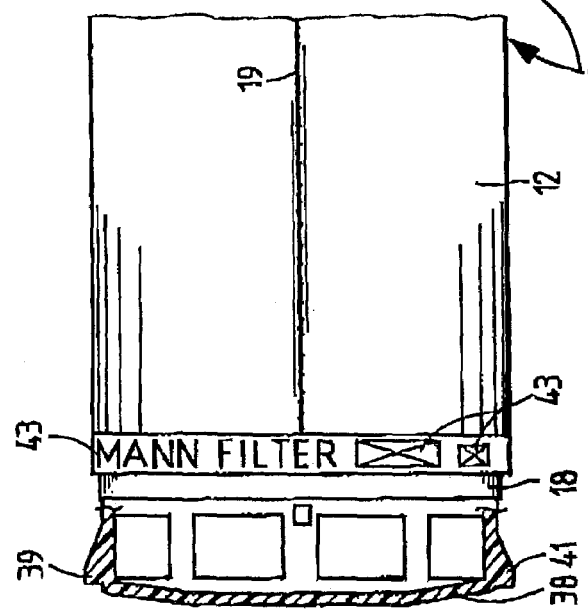
Fig. 2a
Fig. 2

FILTER ELEMENT FOR FILTERING A FLUID STREAM

BACKGROUND OF THE INVENTION

The invention relates to a filter element for filtering a fluid stream, comprising a cylindrical support body, which is provided with openings and is closed at one axial end, and a filter medium, which is arranged on the support body.

German Patent Application no. DE 37 23 807 discloses a tubular filter element that is formed by a rigid, radially perforated support tube, a filter medium and end disks. The exterior of the support tube is covered with the filter medium. The end disks are made of plastic and are subsequently injected onto the support tube. The end disks terminate the filter medium to form a seal, whereby the filter medium is simultaneously fixed on the support tube. It is conventional in the art to cover support tubes with a prefabricated tubular filter medium. The filter medium can, for instance, be sewn together by a longitudinal seam to form the tubular filter medium. This prefabricated tubular filter medium is pulled over the support tube in an assembly step. However, separate tubular filter media must be produced for each support tube diameter, which causes not only significant logistical but also assembly and storage costs. Furthermore, many filter media, particularly coated filter media, cannot be pulled over the support tube in their prefabricated state because they cannot slide on the support tube.

SUMMARY OF THE INVENTION

An object of the invention is to provide an improved filter element with a support tube and a filter medium.

A further object of the invention is to provide a filter element for filtering a fluid which can be produced in a reliable process and at low cost.

Another object is to provide an apparatus for producing the filter element of the invention.

These and other objects are achieved in accordance with the present invention by providing a filter element for filtering a fluid stream, comprising a cylindrical support body, which is provided with openings therethrough so as to be fluid permeable and is closed at one axial end, and a filter medium is arranged on the support body, wherein the filter medium is a strip of filter material that extends over substantially the entire length of the cylindrical support body and is wrapped around the entire circumference of the support body, and has a leading end and a trailing end which are welded together.

In accordance with a further aspect of the invention, the objects are achieved by providing an apparatus for producing a filter element, comprising a mandrel for receiving a fluid permeable support body and a welding unit for welding a filter medium around the support body, wherein the welding unit comprises an ultrasonic welding device.

The filter element according to the invention is intended to filter a fluid, e.g., air. It comprises a support body with an outer surface and two end faces as well as a weldable filter medium. The filter medium can be, for example, a non-woven polyester material or polyester fleece. The support body is cylindrical and can have any cross section. The support body is furthermore permeable to the fluid to be filtered. The permeability of the support body can be produced, for example, by a plurality of openings in the support body or by use of a fluid-permeable material if the cylinder is not perforated. The openings can have any shape, e.g., circular or rectangular.

The filter medium encloses the support body along its outer surface and is welded along its entire length by at least one weld seam. Welding the filter medium causes the filter medium to become denser in the area of the weld seam, so that the weld is not bulkier than the rest of the material. This makes it possible to realize various assembly variants, which cannot be implemented with the bulkier seams created, for example, by sewing.

It is also possible to join the support body to the filter medium by the weld seam. In this case the support body is made of a weldable material that melts at its surface as the filter medium is welded together, so that the filter medium and the support body are joined at least at various points.

The filter medium preferably overlaps along the weld seam to produce a reliable weld. The filter medium, in a continuous process, can be directly unwound from a coil, wrapped around the support body, welded and cut. The sequence of these steps can also be varied. Processing the filter medium directly from the coil eliminates the steps involved in prefabricating a filter tube that is subsequently pulled over the support body. In addition, coated filter media, that cannot slide on the support tube, can be wrapped around the support tube and then welded.

In one embodiment of the invention, the support tube has a seal in the area of an end face. This seal is preferably made of polyurethane resin (PUR) foam, which bonds with both the filter medium and the support body.

In another embodiment, a gripping tab or strap is provided on the closed end face of the support body. This simplifies the replacement of the filter element and furthermore prevents the filter medium from being damaged during handling.

To facilitate correct positioning of the filter element, another embodiment of the invention provides that at least three positioning cams are disposed on the closed end face, i.e., on the end opposite the seal. These positioning cams, in conjunction with a support ring, ensure the correct positioning of the filter element.

In a further aspect of the invention, an apparatus for producing a filter element is proposed. This apparatus comprises a mandrel for holding the support body and a welding unit. The welding unit is preferably an ultrasonic welding system. Such welding units typically have a modular structure. This means that depending on the length of the filter element or filter medium to be welded a corresponding number of welding modules is provided. These modules are arranged along the weld seam and thereby permit longitudinal welding over any filter length.

In a further embodiment of the apparatus for producing a filter element, a feeding device for feeding the filter medium is provided, which has a monitoring unit to monitor the flow of material. This monitoring unit generates a signal when a new coil of filter medium must be put on.

In a further refinement, the apparatus is equipped with an inkjet printer to print labeling data onto the filter medium. This creates a complete production system capable of producing filter elements of the described type in very short process cycles.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which:

FIG. 2 is an exterior side view of a filter element;

FIG. 2a is an end view of the filter element of FIG. 2;

DETAILED DESCRIPTION OF PREFERRED EMBODIMENTS

Figure 1:
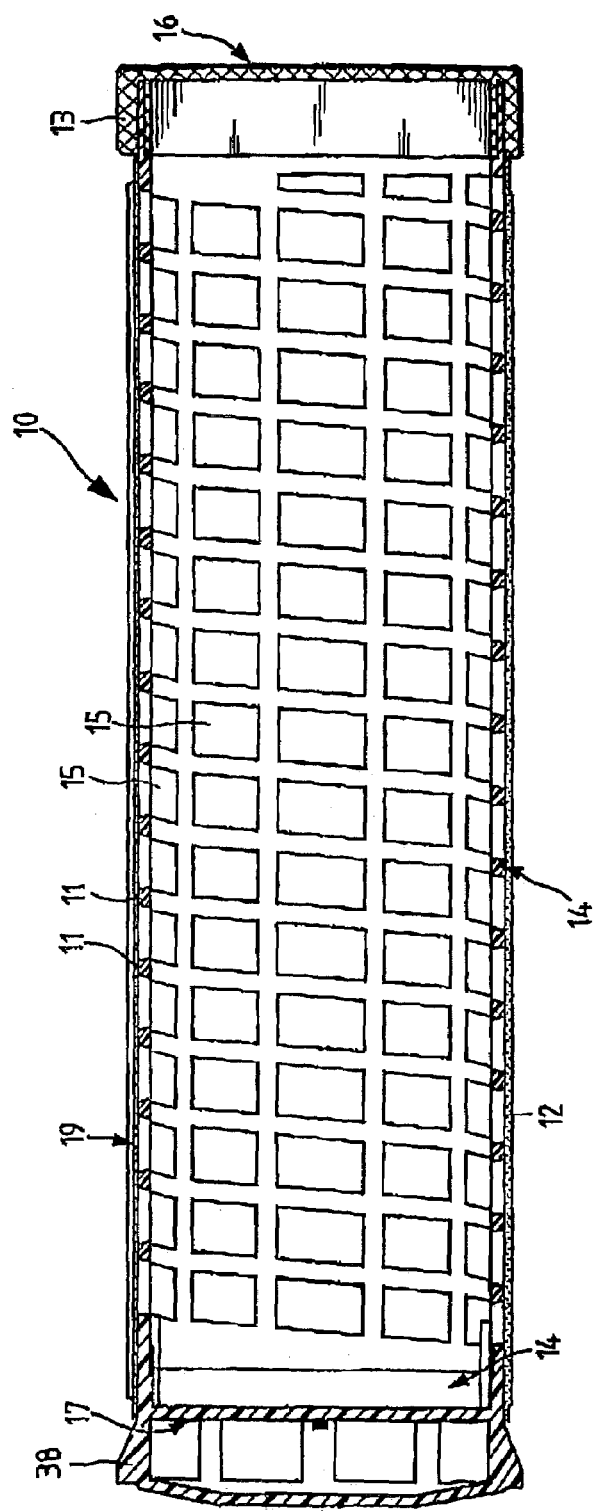
FIG. 1 is is a sectional view of a filter element according to the invention.

FIG. 1 shows filter element 10 in cross section. The filter element 10 comprises a support body 11, a filter medium 12 and a sealing segment 13. The support body 11 has the shape of a circular cylinder and is made of synthetic resin material. To enable the fluid to be filtered to pass through the support body 11, the support body 11 has a plurality of openings 15 in its radially outer surface 14. In this embodiment the openings 15 are rectangular. However, embodiments with, e.g., circular or triangular openings 15 are also feasible.

The support body 11 has a first end face 16 and a second end face 17. In the area of the end faces 16, 17, the outer surface 14 has no openings 15, so that no fluid can pass through the support body 11 at these locations. On the first end face 16, which is open, the sealing segment 13 is disposed. This sealing segment 13 preferably is made of polyurethane resin foam, which encloses the support body 11 and the first end face 16, so that the filter element 10 can be inserted into a holder (not shown) forming a seal. The second end face 17 is closed, so that the unfiltered fluid is prevented from moving from an unfiltered side to a filtered side, even without a mating seal.

Figure 3:
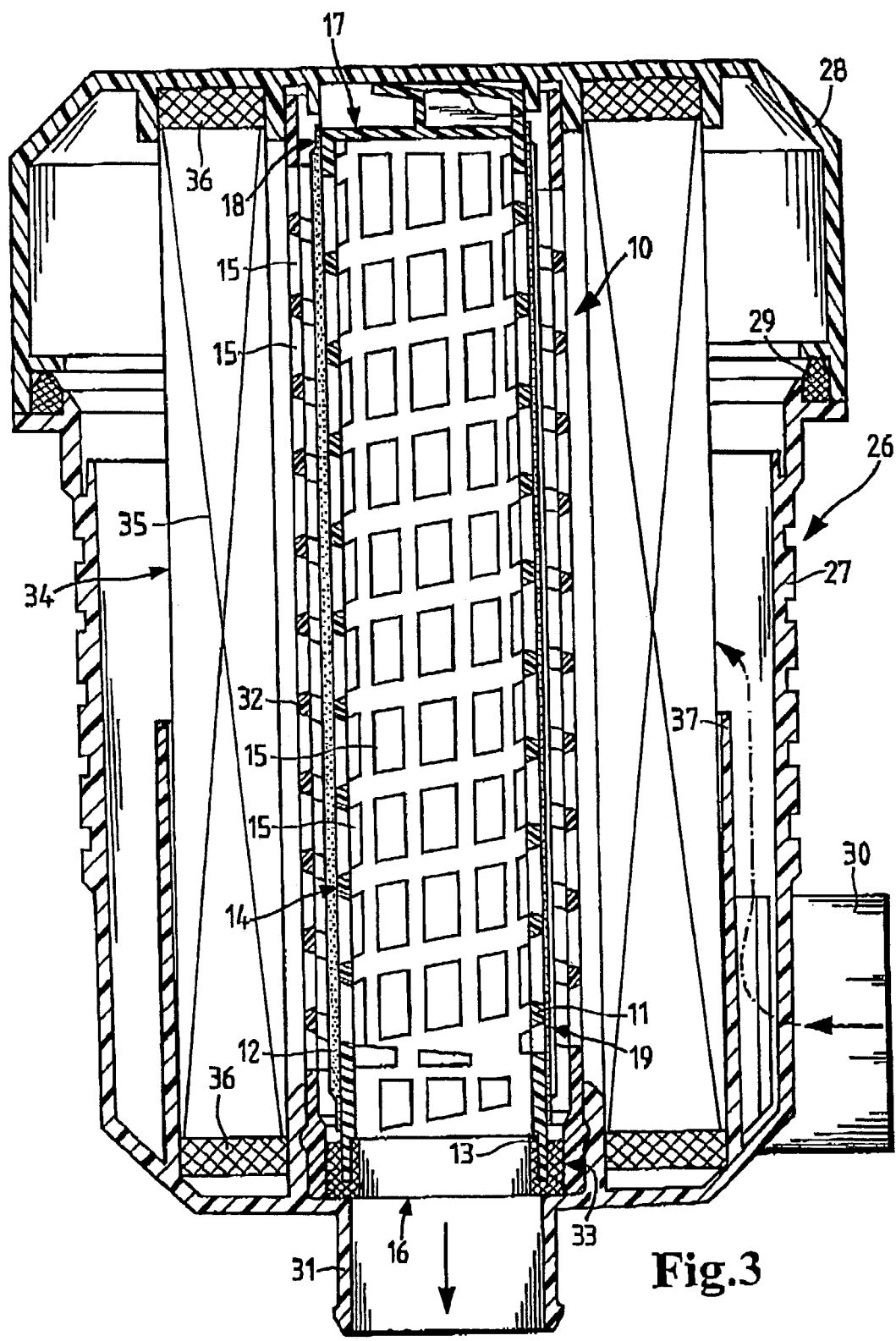
FIG. 3 is a sectional view of an air filter system incorporating a filter element according to the invention.

FIG. 2 is a side elevational view of a finished filter element 10. The sealing segment 13 is clearly visible, as well as the filter medium 12 with its longitudinal weld seam, indicated by line 19. The circumferential weld seam 18 terminates the filter medium. The support body 11 is provided with a gripping tab or strap 38 on its left-hand end. This gripping strap 38 is also visible in the end view of FIG. 2a. Positioning cams 39, 40, 41, 42 for guiding the filter element inside the primary support tube depicted in FIG. 3 are also mounted at the left-hand end. On the surface of the filter medium 12, a labeling field is arranged in the area 43. Using an inkjet printer or some other printing device, the filter element can be labeled by applying appropriate identifying information in this field.

FIG. 3 is a sectional view of an air filter. Parts corresponding to those in FIG. 1 are identified by the same reference numerals. The air filter comprises a cylindrical housing 26 made of synthetic resin material, i.e., plastic, which includes a container 27 and a cover 28. The container 27 is sealingly connected with the cover 28 through a sealing member 29. Near the base of the container 27 are a tangential inlet 30 and an outlet port 31 arranged in the center.

A filter element 10 as described in FIGS. 1 and 2 is inserted into the housing 26. The filter element 10 is arranged coaxially to the outlet port 31 and is surrounded by a hollow cylindrical primary support tube 32 which like the support body 11 is made of synthetic resin material and is provided with openings 15. In the interior of this primary support tube 32, a recess 33 is formed against which the filter element 10 with the sealing segment 13 is sealingly supported in the area of the first end face 16.

An annularly closed star-shaped folded primary filter element 34 is arranged around the primary support tube 32 and is sealingly inserted into the housing 26. This primary filter element 34 is comprised of a filter paper 35 and two end disks 36 sealingly joined thereto. The end disks 36 are made of a resilient material such as polyurethane resin foam which has sealing properties. To enable the air that enters through the inlet 30 to flow toward the primary filter element 34 from more than one point, the container 27 has a flow-guiding wall 37 along which the inflowing air must first rise before it can flow through the primary filter element 34.

If the primary filter element 34 is damaged or missing, the filter element 10 is sealingly interposed as a secondary safety filter between the air inlet 30 and the air outlet port 31, so that the air must flow through filter element 10 and be at least coarsely filtered before it can exit in the direction indicated by the arrow through the outlet port 31.

Figure 4:
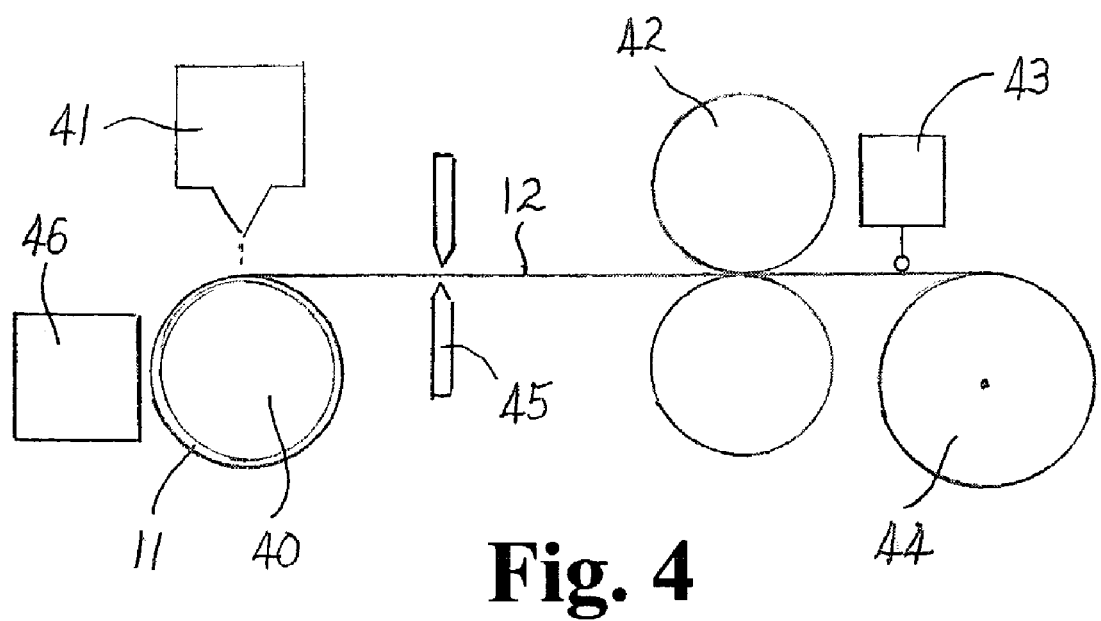
FIG. 4 is a schematic view of an apparatus for producing a filter element according to the invention.

FIG. 4 is a schematic representation of an apparatus for producing a filter element according to the invention. The apparatus comprises a mandrel 40 for the support body 11. A band or strip of filter material 12 is supplied from a coil 44 via a feeding device 42 to the support body 11. A cutter 45 cuts the band of filter material to an appropriate length to wrap all the way around the support body 11 with sufficient overlap to facilitate welding the overlapping ends to form a tubular structure. Welding is effected by a welding device, such as an ultrasonic welder 41. A printer, such as ink jet printer 46, may be provided to apply an identifying legend to the completed filter. The feeding device 42 is provided with a monitoring device 43, which detects when a new coil of filter material is needed.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for filtering a fluid stream, comprising a cylindrical support body, which is provided with openings therethrough so as to be fluid permeable and is dosed at one axial end, and a filter medium is arranged on the support body, wherein the filter medium is a strip of filter material that extends over substantially the entire length of the cylindrical support body and is wrapped around the entire circumference of the support body, and has a leading end and a trailing end which are welded together, the filter element further comprising a gripping strap provided on the closed end face of the filter element, wherein at least three radially-extending positioning cams are provided on the dosed end face to facilitate proper radial positioning of the filter element.

2. A filter element according to claim 1, wherein the filter medium is welded on the support body with at least one longitudinal weld seam.

3. A filter element according to claim 1, wherein the filter medium is welded on the cylindrical support body with a weld seam extending circumferentially around the support body.

4. A filter element according to claim 1, wherein the filter medium is welded on the cylindrical support body with at least a first weld seam extending longitudinally along the support body and a second weld seam extending circumferentially around the support body.

5. A filter element according to claim 1. wherein the support body and the filter medium are fixed together adjacent an end face of the support body by a seal element which is connected to both the filter medium and the support body.

6. A filter element according to claim 5, wherein the seal element is made of a polyurethane resin foam.

* * * * *